US006131878A

United States Patent [19]

Horstmann

[11] Patent Number: 6,131,878

[45] Date of Patent: Oct. 17, 2000

[54] PNEUMATIC LINEAR DRIVE FOR CRYOGENIC CONTROL VALVES

[75] Inventor: Markus Horstmann, Poing, Germany

[73] Assignee: DaimlerChrysler AG, Stuttgart, Germany

[21] Appl. No.: 09/394,330

[22] Filed: Sep. 13, 1999

[30] Foreign Application Priority Data

Sep. 11, 1998 [DE] Germany ........................... 198 41 631

[51] Int. Cl.[7] ............................ F16K 35/00; F16K 31/12

[52] U.S. Cl. ................................................ 251/94; 251/12

[58] Field of Search ............................... 251/94, 12, 111, 251/82, 73

[56] References Cited

U.S. PATENT DOCUMENTS

| | | | |
|---|---|---|---|
| 3,688,794 | 9/1972 | Bird et al. | 251/82 |
| 4,052,995 | 10/1977 | Ellison | 251/94 |
| 4,700,925 | 10/1987 | Russak | 251/94 |
| 4,903,937 | 2/1990 | Jakubiec et al. | 251/94 |
| 5,325,895 | 7/1994 | Pan | 251/94 |
| 5,540,558 | 7/1996 | Harden et al. | 251/82 |

*Primary Examiner*—Kevin Shaver
*Assistant Examiner*—David A. Bonderer
*Attorney, Agent, or Firm*—Ladas & Parry

[57] ABSTRACT

A control valve for controlling flow of fuel from a fuel tank to a rocket engine having a valve body longitudinally displaceable between open and closed positions of the control valve, a piston rod secured in the valve body, and a piston secured to the piston rod. The piston is subjected to a pressure gas in a first control chamber to displace the piston to the open position of the valve, against the action of a spring which urges the valve to the closed position. A locking rod is operated by the pressure gas and carries a locking member for engaging in a groove in the piston rod in the open position of the valve. A switching disk is secured on the locking rod and is subjected to the pressure gas in a first gas chamber to displace the locking member from the groove. The switching disk is provided with a control hole for throttled passage of the control gas to the first control chamber to displace the piston with a slight delay to the open position of the valve against the action of the spring. When the first gas chamber is de-pressurized control gas in the control chamber flows out through the control hole in the switching disk. Pressure gas is supplied to a second gas chamber which acts on the locking rod to keep the locking member out of contact with the piston rod.

7 Claims, 3 Drawing Sheets

PNEUMATIC LINEAR DRIVE FOR CRYOGENIC CONTROL VALVES

FIELD OF THE INVENTION

The invention relates to a pneumatic linear drive for cryogenic control valves in liquid fuel lines of rocket engines.

BACKGROUND AND PRIOR ART

Such a pneumatic linear drive is known from DE 43 23 846 C1. This drive comprises a pneumatic piston and cylinder unit, a spring urging the piston rod in the direction of an end position, a lock member for engaging in a groove in a piston rod and a locking rod for displacing the lock member. Additionally, two separate chambers are provided which can be pressurized or vented to control the lock member and the piston. A disadvantage of this drive is that the lock member remains in contact with the piston rod producing damage thereof due to friction and ultimate malfunction.

DE 42 21 230 C1 discloses a similar construction of a drive in which the lock member is in surface contact with the piston rod thus having the same problem of frictional wear.

SUMMARY OF THE INVENTION

An object of the invention is to provide a pneumatic linear drive having a locking member, which can be switched between engagement and disengagement in a groove of the piston rod and which is free from contact with the piston rod when the piston is moved so that the piston rod can freely travel between the open and closed positions of the valve.

This object is achieved by employing a particular drive means for moving the locking member and the piston.

According to the invention, the valve includes a spring which urges a valve body from an open position of the valve to a closed position of the valve. A locking member on a locking rod is engaged in a groove in a piston rod in the open position of the valve. A switching disk is secured on the locking rod and is subjected to a pressure gas in a first gas chamber to displace the locking member from the groove in the piston rod so that the locking member is free of contact with the piston rod. The switching disk has a control hole for passage of the pressure gas through the switching disk to a first control chamber to displace a piston to an open position of the valve against the force of the spring. The first gas chamber can be selectively pressurized or de-pressurized and when pressurized, pressure gas is supplied to the first control chamber via said control hole to open the valve. When the first gas chamber is de-pressurized, the piston is displaced by the spring to the closed position of the valve, and the pressure gas in the control chamber is exhausted through the control hole in the switching disk to the first gas chamber. In order to keep the locking rod out of contact with the piston rod, pressure gas is supplied to a second gas chamber to apply pressure to the locking rod.

DETAILED DESCRIPTION

Figure 1:
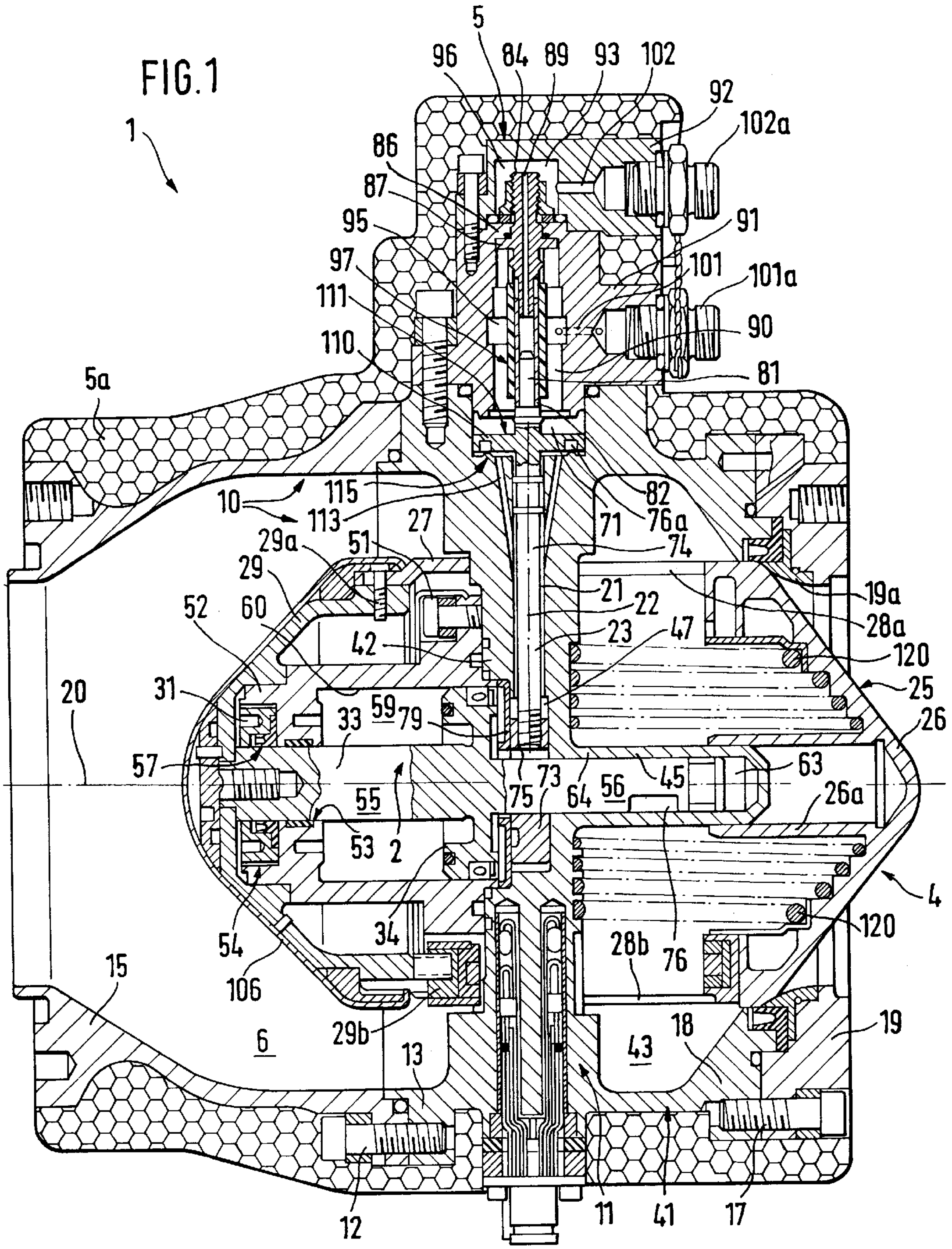
FIG. 1 is a sectional view of a valve with a linear drive and locking mechanism, according to the invention, wherein a valve body of the valve is in a closed and unlocked position.
Figure 2:
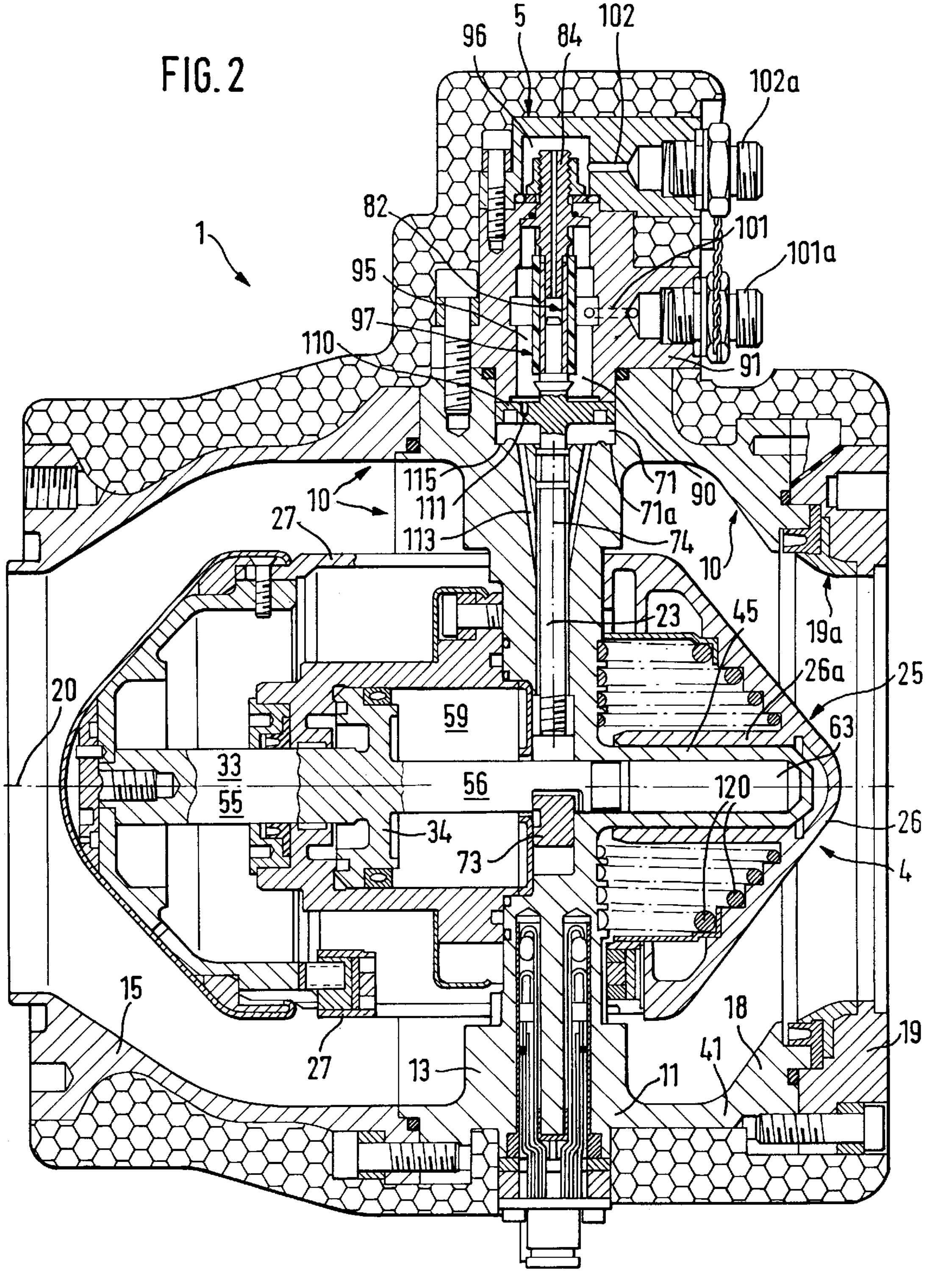
FIG. 2 is a sectional view similar to FIG. 1 in which the valve body is in the open and locked position.
Figure 3:
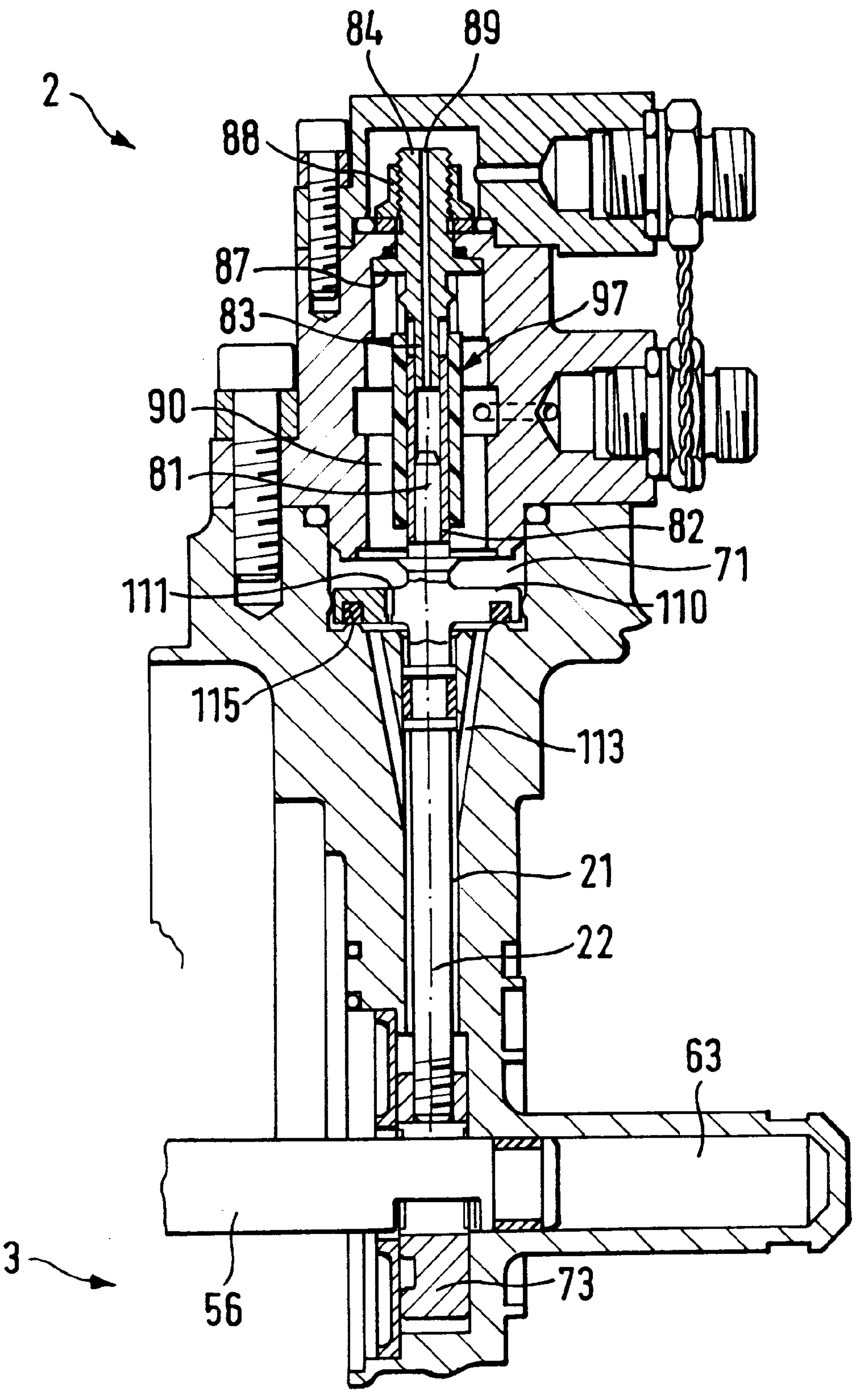
FIG. 3 is a sectional view, on enlarged scale, showing the locking mechanism in the locked or engaged position.

The drawing illustrates a valve 1 according to the invention which comprises a linear drive 2 and a lock mechanism 3 for the linear drive 2. The valve 1 has a valve body 4, which can be moved by the linear drive from an open position (FIG. 2) to a closed position (FIG. 1) and vice versa. Valve 1 is disposed between a fuel tank (not shown) and a rocket engine (not shown) and can be connected to the engine directly or via a corresponding fuel line (not shown). In the representation of FIGS. 1 to 3, the fuel tank is at the left side of the drawing and the rocket engine is at the right side of the drawing. Fuel flow is therefore in the direction from left to right via a fuel flow channel 6.

The valve 1 comprises a valve housing 10 including a central housing part 11 slidably supporting valve body 4 and essentially configured as rotationally symmetrical around a longitudinal axis 20. The valve further includes connection members 15, 19 and a control housing 5. The valve 1 is surrounded by an insulation layer 5*a*. Fasteners 12 are arranged uniformly at the periphery of a flange 13 of central housing part 11 to secure connection member 15 to housing 10 at the side facing the fuel tank. Likewise, fasteners 17 are distributed uniformly at the periphery of a corresponding flange 18 of central housing part 11 to secure connection member 19 to housing 10 at the side facing the rocket engine. Connection members 15, 19 serve for connection to a fuel line or for direct connection of valve 1 to the fuel tank and the rocket engine.

Connection members 15, 19 are configured as rotationally symmetrical bodies and are arranged concentrically relative to one another about longitudinal axis 20 along which movement of valve body 4 takes place. Central housing part 11 has a transverse bore 21 with an axis 22, which extends perpendicular to longitudinal axis 20. A locking rod 23 is arranged for longitudinal displacement in bore 21.

Valve body 4 has a conical face plate 25 with a front surface 26 facing in the direction of fluid flow to the rocket engine. A cylindrical part 27 having two longitudinal slots 28*a*, 28*b* extends from face plate 25 in the direction towards the fuel tank. The slots 28*a*, 28*b* extend parallel to the longitudinal axis 20 and are diametrically opposite one another. The central housing part 11 projects through the slots 28*a*, 28*b* enabling longitudinal displacement of valve body 4 in valve housing 10. The central housing part 11 and locking mechanism 3 partly project through valve body 4. At the free end of the cylindrical part 27, i.e., at the end of valve body 4 facing the fuel tank, a holding device 29 is secured by fasteners 29*a*, 29*b*. The holding device 29 is also constructed as a rotationally symmetrical body around the longitudinal axis 20. A piston rod 33 attached to a piston 34 is concentrically arranged on axis 20 by fasteners 31 which secure the piston rod to the holding device 29. The holding device 29 has a conical shape facing the fuel tank. Piston rod 33 extends from the end of holding device 29 into the valve body 4.

Central housing part 11 comprises an outer cylindrical portion 41 with integral flanges 13, 18 and an inner tubular portion 42. The outer portion 41 surrounds valve body 4 and extends longitudinally to form a flow cross-section 43 in flow channel 6 between the outer portion 41 and the valve body 4. The tubular inner portion 42 of central housing part 11 extends perpendicular to longitudinal axis 20 and has sections with different outer diameters. The inner portion 42 extends radially outwards of outer portion 41 at diametrically opposite regions of the outer portion 41.

A piston housing 45, concentric with longitudinal axis 20, projects from inner portion 42 in the direction towards the rocket engine. Housing 45 is closed at the end closest to the rocket engine and is open to bore 21 in central housing part 11. The inner portion 42 has a bore 47 concentric with longitudinal axis 20, which opens bore 21 to holding device 29 or to piston rod 33. In this way, it is possible for piston rod 33 to project through inner portion 42 from the tank side by an amount depending on the position of the valve body 4 relative to central housing part 11 and thus to piston housing 45.

A housing 52 is attached to the inner portion 42 of central housing part 11 by fasteners 51 extending axially within the cylindrical part 27 of valve body 4. In the region of fasteners 51 or of housing 52, the inner portion 42 of central housing part 11 is cylindrical or rotationally symmetrical around the longitudinal axis 20, in order to effect a coupling of the housing 52, also formed as a cylinder rotationally symmetrical around longitudinal axis 20. Housing 52 has at its end closest to the tank a bore 53 and a recess 54 which is opened at the tank 15 side. Piston rod 33, secured to holding device 29 of valve body 4, has a first part 55 and a second part 56. In the transition from first part 55 which is closer to the tank and the second part 56, which is closer to the rocket engine, piston 34 is disposed and projects outwardly from piston rod 33. Bore 53 in housing 52 is dimensioned such that first part 55 of piston rod 33 projects through it with a precise but slidable fit. In order to seal the inside of housing 52, sealing elements 57 are provided in recess 54 of housing 52, the sealing elements being attached to the end of housing 52 closer to the tank and engaged with the outside surface of the first part 55 of piston rod 33. A first control chamber 59 is formed in housing 52, rotationally symmetrical around longitudinal axis 20. The piston rod 33 extends centrally in chamber 59 and its outer surface is slidably guided by inside surface 60 of housing 52 in the region of the first control chamber 59. The second part 56 of piston rod 33 extends, in both end positions of piston rod 33, through region 61 of inner portion 42 configured in rotationally symmetrical manner around longitudinal axis 20 and partly extends into piston housing 45. Between the free end of the second part 56 and the inside of the free end of piston housing 45, a second control chamber 63 is formed, which is connected via the intermediate space 64, between the outer surface of the second part 56 of piston rod 33 and the inside surface of piston housing 45. However, the outside surface of second part 56 of piston rod 33 is applied sufficiently against the inside surface of piston housing 45, so that piston rod 33 is also partly guided by the inside surface of piston housing 45 and by the guidance of piston 34 in guide surface 60. A cylindrical guide sleeve **26*a* extends from the front end. 26 of conical face plate 25 and slidably receives the piston housing 45 of central housing part 11. The cylindrical guide sleeve 26*a* provides an additional guide for valve body 4** in its longitudinal movement or in its respective adjustment.

Bore 21 of central housing part 11 extends to the edge surface of bore 47 in central housing part 11, to connect bore 21 and bore 47. The axes of the respective bores 21 and 47 extend perpendicular to one another. The locking rod 23 projects outwardly from bore 21 into a recess 71 at its upper end and partially projects into bore 47 and carries a locking member 73 at its lower end. Locking member 73 is preferably formed as a cylinder with its axis extending parallel to longitudinal axis 20 and it can be moved transversely in the direction of axis 74 of bore 21 inside bore 47. Locking member 73 has a bore 75, through which projects the second part 56 of piston rod 33. In the region of the free end of the first part 55 of piston rod 33, a locking groove 76 is provided, which is engageable in a form-fitting manner by a corresponding portion 77 of locking member 73 for locking the longitudinally moveable piston rod 33 relative to the locking rod 23. Groove 76 and portion 77 of locking member 73 are disposed on the lower side of piston rod 33 so that locking member 73 thus engages groove 76 from below with an appropriate longitudinal movement of locking rod 23. On the side of bore 47 facing the first control chamber 59, a diaphragm 79 is arranged in order to guide locking member 73.

At the free end of locking rod 23 projecting beyond piston 4, the locking rod has a reduced diameter portion 81 onto which an extension sleeve 82 is secured with a press fit. A lower portion 83 of a tubular connection member 84 slidably extends into the sleeve 82. The connection member 84 extends beyond sleeve 82 and is rotationally symmetrical around axis 74 and is retained radially and axially by means of a corresponding constriction 86 in control housing 5. Connection member 84 is secured to control housing 5, on the one hand, by an external flange 87 on connection member 84 which bears against constriction 86 from below, and, on the other hand, by a nut 88, which is screwed onto connection member 84 together with a corresponding washer on the other side of constriction 86. The connection member 84 has a bore 89 extending centrally therethrough, which opens outwardly of connection member 84 at its upper end and into the inside of sleeve 82 at its lower end.

Control housing 5 is secured by fasteners in the region of recess 71 at the outside of central housing part 11. Control housing 5 is formed of two parts and comprises a lower part 91 with a bore 90 and an upper part 92 with a bore 93. Bores 90, 93 are concentric and are separated from one another by constriction 86, which is engaged in a peripheral region of connection member 84. Since the inner diameters of bores 90 and 93 are larger than the outer diameters of sleeve 82 or connection member 84, a lower gas chamber 95 is formed in the lower part 91 and an upper gas chamber 96 is formed in the upper part 92, between the walls of bores 90 or 93 and the outside surfaces of connection member 84 and sleeve 82. A cylindrical piece 97 is secured to connection member 84 and slidingly surrounds sleeve 82 in lower gas chamber 95. Piece 97 is slidably secured at a first end to a corresponding site of sleeve 82 and at its second end is sealably engaged with a corresponding site of a lower part of connection member 84. Since locking rod 23 is supported in a displaceable manner together with sleeve 82 relative to connection member 84, sleeve 82 is displaceable from an initial position when locking rod 23 is moved away from connection member 84.

A lower inlet channel 101 is provided in the lower part 91 of control housing 5, and channel 101 opens into a lower pressure connection **101*a* on the outside of lower part 91 of control housing 5. Similarly, an upper inlet channel 102 is provided in upper part 92 of control housing 5, and channel 102 opens into an upper pressure connection 102*a* at the outside of upper part 92. The lower pressure connection 101*a* and the upper pressure connection 102*a* are connected to a pressure tank (not shown) by means of a four-way valve (not shown). A pressure medium, such as a pneumatic control gas at an appropriate pressure, is provided in the pressure tank. A control unit (not shown) controls the four-way valve, which acts on the lower inlet channel 101 and/or the upper inlet channel 102, depending on the respective control setting. In this way, control gas can be supplied to the corresponding channel from the pressure tank and/or one or both of channels 101, 102** can be closed and/or de-pressurized (vented, to atmosphere or to a suction source).

An on-off valve in the form of a switching disk 110 having a control bore 111 is arranged in recess 71 in central housing part 11. At least two control channels 113 extend from the bottom of recess 71, at a distance from the edge of bore 21. Control channels 113 open into bore 21 after extending a specific distance in the direction of longitudinal axis 20 and obliquely relative to axis 74 of locking rod 23. Switching disk 110 is rigidly secured to the locking rod 23 or is integrally formed therewith. In the lower portion of locking rod 23, which is shown in FIG. 1, i.e., in the position in which the locking rod is moved furthest away from longitudinal axis 20, the lower surface of switching disk 110 is applied against the bottom of recess 71. On the underside of switching disk 110, i.e., that side, which faces the bottom 71*a* of recess 71 an annular sealing element 115 is disposed. Sealing element 115 provides for a seal of the switching disk 110 against the bottom 71*a* of recess 71, when the disk is in its lower position. The bore 111 opens at the bottom of disk 110 within the annular sealing element 115.

In the region of the connection of central housing part 11 to connection member 19, an annular gasket 19*a* is provided. A corresponding region on the outer part of conical face plate 25 engages gasket 19*a* when the valve 1 is closed. In this position, fuel is prevented from reaching the rocket engine. When valve body 4 is moved away from gasket 19*a,* i.e., to the left or against the flow direction of the fuel from the fuel tank to the rocket engine, the fuel channel 6 is opened and fuel can flow from the fuel tank to the rocket engine.

An indicator device 105 arranged on central housing part 11 and which preferably operates on a magnetic basis indicates the positions of valve body 4 in valve 1.

A flow cap 106 on holding device 29 seals fastening elements 28*a,* holding device 29 and fastening elements 31 from fuel channel 6.

Valve body 4 is pre-stressed by coil spring 120 away from central housing part 11. One end of spring 120 engages against the inside of conical face plate 25 and the other end of the spring engages against the outside of region 61 of central housing part 11. The spring 120 urges valve body 4 against gasket 19*a*. In order to move valve body 4 in the direction of the fuel tank to open valve 1, the force of spring 120 must thus be overcome.

The operation of the valve 1 is described hereafter.

In FIG. 1, valve 1 is shown in its closed position, in which valve body 4 is applied against gasket 19*a*. In this position, the fuel tank is blocked relative to the rocket engine, i.e., no fuel flows through fuel channel 6 to the engine. In the closed position of valve 1, no pressure medium is supplied to the lower pressure connection 101*a* and pressure medium is supplied to the upper pressure connection 102*a*.

In the closed position of FIG. 1, valve body 4 has been displaced as far as possible to the right, i.e., in the direction towards the rocket engine. Since piston rod 33 is rigidly secured to valve body 4, the second part 56 of piston rod 33 is displaced as far as possible to a first end position into piston housing 45 of central housing part 11. Groove 76 in the second part 56, is longitudinally displaced as far as possible to the right from axis 74. Likewise, piston 34 on piston rod 33 is also moved as far as possible to the right and lies as close as possible to central housing part 11. Due to the position of locking member 73 relative to piston rod 33, locking rod 23 is moved as far as possible downward, in the direction of the piston rod, due to the pressure prevailing in the upper gas chamber 96 and thus also inside sleeve 82. In this way, the underside of switching disk 110 is applied against the bottom 71 a of recess 71.

Coil spring 120 holds valve body 4 in its closed position, since the spring 120 urges conical face plate 25 away from central housing part 11 and against gasket 19*a*.

In order to open valve 1 and to move valve body 4 from its closed position to the open position shown in FIG. 2, the upper inlet channel 102 is closed by the four-way valve (not shown) and the lower inlet channel 101 is pressurized by control gas from the pressure tank (not shown). The control gas then flows through the lower inlet channel 101 into the lower gas chamber 95 of control housing 5. The lower gas chamber 95 is formed by the intermediate space, between the inside of lower part 91 of control housing 5, the corresponding outer surfaces of connection member 84, the outside surface of piece 97, a part of the cylindrical inside surface of recess 71, and the upper side of switching disk 110. The control gas in lower chamber 95 flows through control bore 111 in switching disk 110 and into an inner space of a constricted height, which is formed between the underside of switching disk 110 and bottom 71*a* of recess 71 and the free inside surface of annular sealing element 115. Control bore 111 thus produces a throttling of the flow of the control gas. The control gas then flows into control channels 113 and into the intermediate space between locking rod 23 in bore 21. The control gas then flows into bore 47 and into the intermediate space between locking member 73 in bore 47. The control gas flows further into the space between the inside surface of bore 75 and the corresponding part of the outside surface of piston rod 33. From there, on the one hand, the control gas flows between the piston housing 45 and the second part 56 of piston rod 33 into the second control chamber 63, and, on the other hand, into the first control chamber 59 between the side of piston 34 and the facing side of central housing part 11. The pressure of the control gas in chamber 59 causes piston 34 to move away from central housing part 11 overcoming the pressure of spring 120. In this way, piston 34 produces an increasingly larger space of the first control chamber 59 between piston 34 and central housing part 11. Simultaneously, the part of the second control chamber 63 between the second part 56 of piston rod 33 and piston housing 45 is also increasingly enlarged. Thus, due to the pressure of the control gas, piston 34 and thus valve body 4 are moved to the left towards the fuel tank, as shown in FIG. 2. This displacement of valve body 4 is produced against the force of spring 120 up to a position in central housing part 11, in which, viewed in the direction of longitudinal axis 20, groove 76 of piston rod 33 coincides with locking member 73. Due to the pressure of the control gas in the upper chamber 96 of control housing 5, switching disk 110 is pressed downwardly and thus maintained against the bottom 71*a* of recess 71. In this way, locking rod 23 and thus locking member 73, are held in their lowermost positions. In this position, locking member 73 is free from contact with piston rod 33, so that friction forces do not develop due to contact of locking member 73 against the second part 56 of piston rod 33, when piston rod 33 is moved relative to locking member 73. The lowermost position of locking rod 23 also causes piece 97 to be in its extended state.

Locking member 73 is aligned with groove 76 when piston 34 is moved to the front of chamber 59 away from bore 47. In this position, piston rod 33 is locked by locking member 73. To this end, the upper inlet channel 102 is vented. Control gas in the space between the end 81 of locking rod 23 and connection piece 84 between sleeve 82 passes through bore 89 of connection piece 84, through upper chamber 96 of control housing 5 and the upper inlet channel 102. In this way, the force required for extending piece 97 is reduced and locking rod 23 moves upwards, i.e., to the upper chamber 96, due to the lower pressure in the upper chamber 96. Switching disk 110 and locking member 73 also move in this direction. Switching disk 110 moves upwards until its upper side is engaged with a support surface at the underside of control housing 5. In this position, the locking rod is in a position, in which locking member 73, is engaged in groove 76. In this position, piston rod 33 is locked against movement along longitudinal axis 20 and valve body 4 is locked in the open position shown in FIG. 2. In this open position of valve body 4 and the locked position of piston rod 33, fuel flows from the fuel tank through fuel channel 6 to the rocket engine. In this position, the upper inlet channel 102 is vented and the lower inlet channel 101 is pressurized.

In order to close valve 1, i.e., to go from the open position of FIG. 2, in which valve body 4 is locked, to the position shown in FIG. 1, the upper inlet channel 102 is pressurized. In this way, control gas at the appropriate pressure flows into the upper chamber 96 of control housing 5 and into bore 89 of connection piece 84. From there, the control gas flows inside sleeve 82 and pushes end 81 of locking rod 23 away from connection piece 84 End 81 is extended and the locking rod 23 moves downwards. Consequently, the locking member 73 moves out from groove 76 and releases piston rod 33 to move in the direction of the rocket engine. Simultaneously or subsequently, the lower inlet channel 101 is vented or connected to vacuum. The control gas in the first control chamber 59 and in the second control chamber 63 leaks out through bore 21, control channels 113, control holes 111, lower chamber 95 and lower inlet channel 101. Thus, the control gas no longer produces pressure in the control chambers 59, 63, and spring 120 thus moves valve body 4 to the right, i.e., towards the rocket engine and gasket 19*a*. Switching disk 110 is pressed against the bottom 71*a* of recess 71. Control hole 111 produces a throttling of the escaping control gas. Thus, piston rod 33 moves only if locking member 73 is moved out of groove 76, so that jamming of locking member 73 in groove 76 is prevented.

Although the invention is disclosed with reference to particular embodiments thereof, it will become apparent to those skilled in the art that numerous modifications and variations can be made which will fall within the scope and spirit of the invention as defined by the attached claims.

What is claimed is:

1. A control valve for controlling flow of fuel from a fuel tank to a rocket engine, said control valve comprising:

a valve body longitudinally displaceable between open and closed positions of the control valve, a piston rod secured in said valve body, a piston secured to said piston rod, said piston being subjected to a pressure gas in a first control chamber to displace the piston to the open position of the valve, a spring urging the valve to the closed position, a locking mechanism including a locking rod operated by the pressure gas and having a locking member for engaging in a groove in the piston rod in said open position of the valve, a switching disk on said locking rod subjected to the pressure gas in a first gas chamber to displace the locking member from said groove in the piston rod so that the locking member is free of contact with the piston rod, said switching disk having a control bore for passage of said control gas through the switching disk to said first control chamber to displace said piston to said open position of the valve against the force of the spring, said first gas chamber being selectively pressurized and de-pressurized to move the switching disk when pressurized to release the locking member from said groove in the piston rod and when said first gas chamber is de-pressurized the piston rod is displaced by said spring to said closed position of the valve, and said control gas is discharged from said first control chamber through said control bore in said switching disk to the de-pressurized first chamber and said locking member is kept out of contact with said piston rod by application to said locking rod of pressure gas in a second gas chamber.

2. A control valve according to claim 1, comprising a connection member separating said second gas chamber from said first gas chamber, said locking rod being axially displaceable relative to said connection member, said connection member having an axial hole therethrough which communicates with said second gas chamber, and with said locking rod so that pressure gas in the second gas chamber applies pressure to the locking rod in a direction to remove the locking member from the groove in the piston rod.

3. A control valve according to claim 2, comprising a sleeve on said locking rod, said connection member supplying pressure gas in said second gas chamber to said rod via said sleeve.

4. A control valve according to claim 3, comprising a piece slidable on said sleeve and secured on said connection member.

5. A control valve according to claim 2, comprising a sealing ring on said switching disk which seals the disk, when the locking rod is disengaged from the groove, said control bore being located in said disk within said sealing ring to provide communication between said second gas chamber and said first control chamber.

6. A control valve according to claim 1, wherein said control bore in said switching disk provides throttled communication between said second gas chamber and said first control chamber.

7. A control valve according to claim 6, wherein a second control chamber is provided between an end of the piston rod and a facing end of a piston housing.

* * * * *